(12) United States Patent
Häussler et al.

(10) Patent No.: US 9,016,548 B2
(45) Date of Patent: Apr. 28, 2015

(54) METHOD AND DEVICE FOR PRODUCING WELDED CONNECTIONS

(75) Inventors: Franz Häussler, Lechbruck am See (DE); Hans Hundegger, Pfronten-Weissbach (DE)

(73) Assignee: Haussler Innovation GmbH, Kempten (DE)

( * ) Notice: Subject to any disclaimer, the term of this patent is extended or adjusted under 35 U.S.C. 154(b) by 180 days.

(21) Appl. No.: 13/514,774

(22) PCT Filed: Aug. 16, 2010

(86) PCT No.: PCT/EP2010/061909
§ 371 (c)(1),
(2), (4) Date: Jun. 8, 2012

(87) PCT Pub. No.: WO2011/042240
PCT Pub. Date: Apr. 14, 2011

(65) Prior Publication Data
US 2012/0263968 A1    Oct. 18, 2012

(30) Foreign Application Priority Data
Oct. 6, 2009 (DE) .......................... 10 2009 048 425

(51) Int. Cl.
| | | |
|---|---|---|
| B23K 31/02 | (2006.01) |
| B23K 37/04 | (2006.01) |
| B21F 23/00 | (2006.01) |
| B21F 27/10 | (2006.01) |
| B21F 27/20 | (2006.01) |
| B23K 11/00 | (2006.01) |
| E04C 5/04 | (2006.01) |

(52) U.S. Cl.
CPC ....... *B21F 23/005* (2013.01); *Y10T 428/12347* (2015.01); *B21F 27/10* (2013.01); *B21F 27/20* (2013.01); *B23K 11/0086* (2013.01); *E04C 5/04* (2013.01)

(58) Field of Classification Search
None
See application file for complete search history.

(56) References Cited

U.S. PATENT DOCUMENTS

| 1,821,696 | A | * | 9/1931 | Edge ............................... 52/852 |
| 2,816,052 | A | * | 12/1957 | Fischer et al. ................ 148/599 |
| 3,209,793 | A | * | 10/1965 | Miura ............................ 140/112 |
| 3,253,332 | A | * | 5/1966 | Howlett et al. ................. 29/506 |
| 4,667,452 | A | * | 5/1987 | Dick et al. .................... 52/649.1 |
| 5,154,534 | A | * | 10/1992 | Guerin et al. .................... 404/70 |
| 5,613,340 | A | * | 3/1997 | Bollaert et al. ................. 52/851 |
| 6,205,737 | B1 | * | 3/2001 | Haussler ...................... 52/649.1 |
| 2010/0044350 | A1 | * | 2/2010 | Heiml et al. ............. 219/121.14 |

FOREIGN PATENT DOCUMENTS

CN    201275674 Y  *  7/2009
EP    862958 A2 *  9/1998

* cited by examiner

*Primary Examiner* — Devang R Patel
(74) *Attorney, Agent, or Firm* — Notaro, Michalos & Zaccaria P.C.

(57) ABSTRACT

A method and machine for producing welded reinforcing steel rod mats for use in the production of DIN-conforming reinforced concrete components having primarily no static loads, and to such a reinforcing steel rod mat, uses a welding device, one or more reinforcing steel rods, and one or more stay braces in the case of uniaxial reinforcing steel mats, positioned relative to each other with position control and optionally with position correction of the reinforcing steel rods to be welded together, and a reinforcing steel rod is welded in the area of at least one of the ribs thereof to a stay brace, or to another reinforcing steel rod in the area of at least one of the ribs of the rod.

5 Claims, 5 Drawing Sheets

Figure 1:
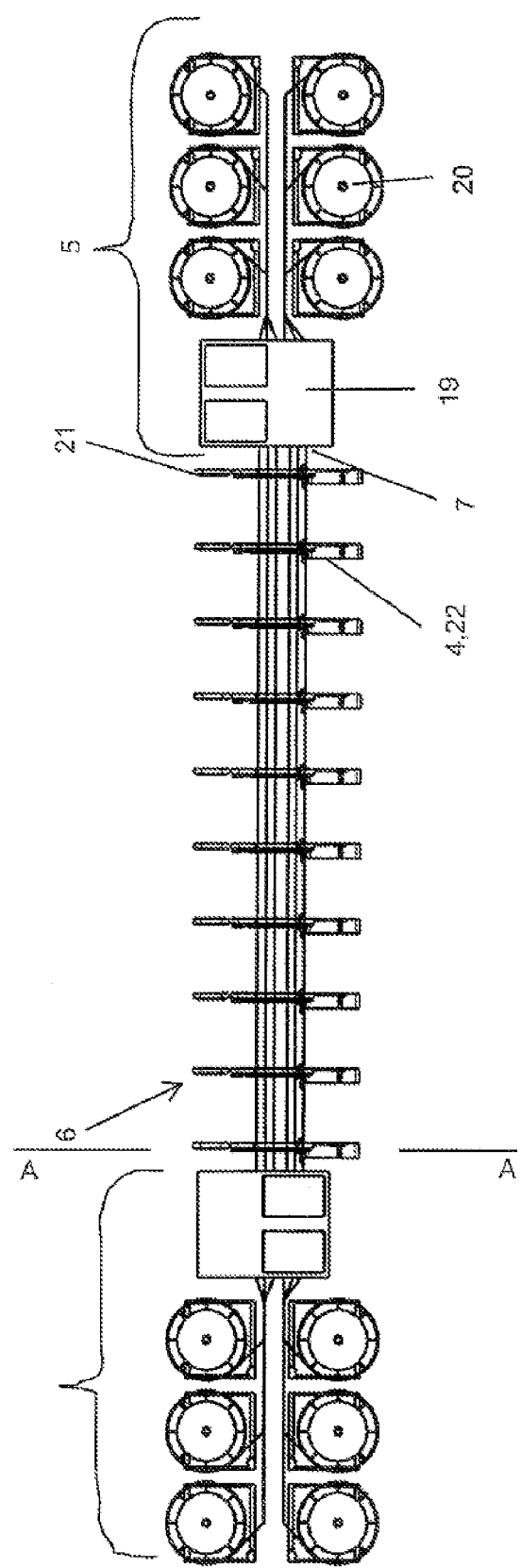

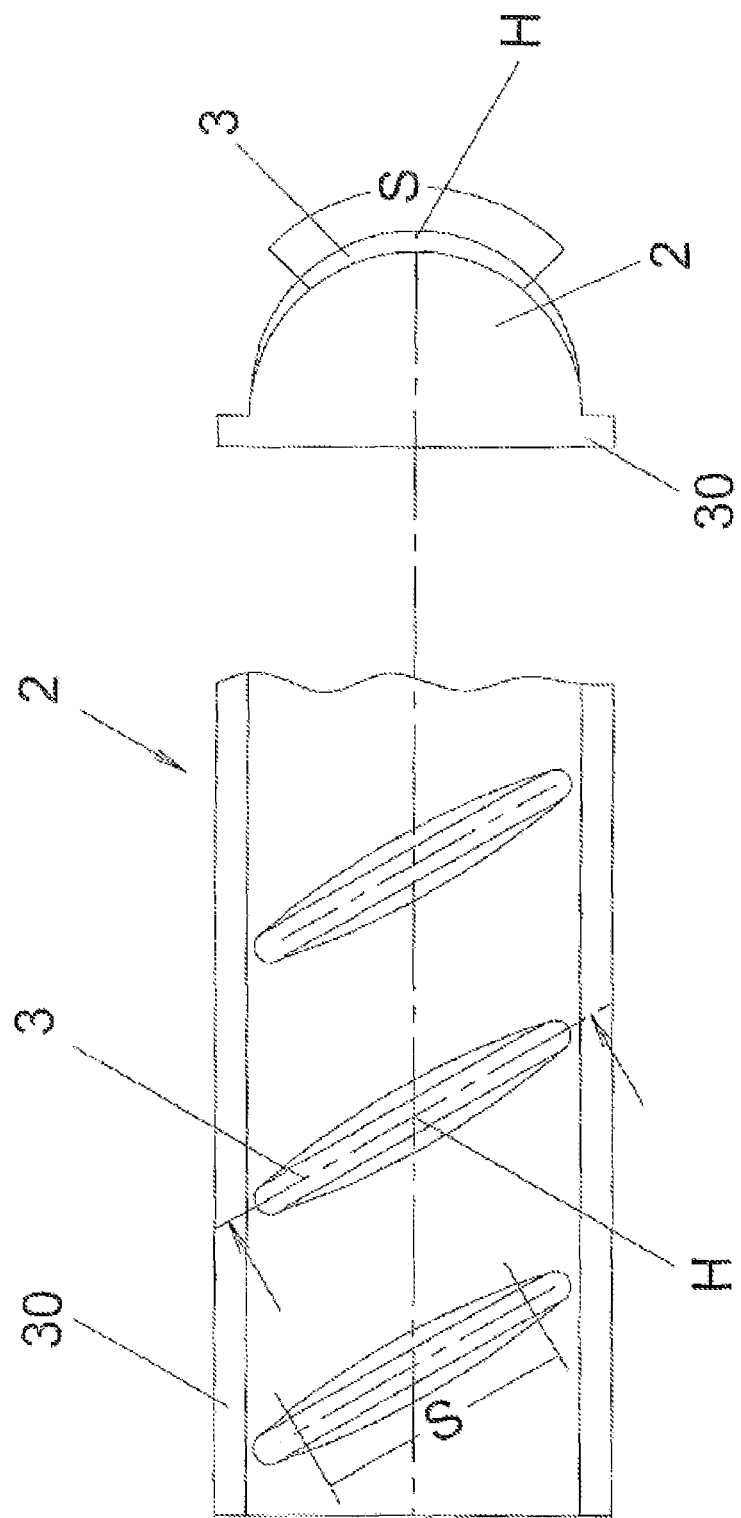
FIG. 5a, b

METHOD AND DEVICE FOR PRODUCING WELDED CONNECTIONS

The present invention relates to a method and to a device for producing welded connections between steel bodies for use in the production of DIN-conforming reinforced concrete components that are not predominantly subjected to static loads.

In order to improve the static properties of concrete components in reinforced concrete construction, steel bodies or steel rods that absorb tensile forces and thusly supplement the compressive strength of the concrete are used such that the load bearing capacity of corresponding reinforced concrete components is improved. The steel bodies and steel rods are either interlaced with one another manually at the construction site or used in the form of welded uniaxial or biaxial steel mats or segments of special shapes, wherein reinforcing steel or round bar steel is used as material. The reinforcing steel rods produced by means of cold-forming or hot-forming are typically not twisted, have a nearly circular cross section and an obliquely ribbed surface and, if applicable, feature longitudinal ribs. In this case, the oblique ribs are typically realized with a lunulate cross section and have a dimension of about 6.5% of the core cross section of the rod at the highest point. Reinforcing steel rods are frequently up to 15 m long and usually have diameters up to 32 mm such that their weight can reach several hundred kilograms.

Welded connections of the type encountered in reinforcing steel rod mats or in special segments have been known for a long time and proven themselves for predominantly static loads. Welded uniaxial reinforcing steel rod mats that can be installed at the construction site in a particularly time-saving fashion are particularly advantageous. Corresponding production machines have also been known for a long time, for example, from EP 0 862 958 or from PCT/DE2009/000298. The machine for producing uniaxial reinforcing steel rod mats described in EP 0 862 958 features a lateral reinforcing steel rod feed to a mat former, wherein prefabricated reinforcing steel rods are removed from a storage magazine or reinforcing steel rods yet to be fabricated are unwound from supply rolls, straightened and cut to size by means of a rod former realized in the form of a straightening-cutting machine. The reinforcing steel rods fed into the mat former are positioned transversely to the mat by means of a transverse positioning device and welded to flexible stay braces by means of an automatic welding machine. In biaxial reinforcing steel rod mats, the rods are welded to other rods.

Known welded reinforcing steel rod mats, however, are not suitable for reinforced concrete components and structures that are not predominantly subjected to static loads, e.g., of the type occurring in civil engineering and in structural engineering. Concrete components for road and railroad bridges that are subjected to alternating loads due to moving traffic should be mentioned in this context. Offshore structures that are stressed by wave action and structures that experience dynamic excitations due to gusty winds or shedding of vortices such as towers, masts or high-rise buildings are likewise affected. Concrete components in industrial structures such as craneways, stacker covers or machine foundations should also be mentioned. In all these components, material fatigue can occur due to permanent high-cycle alternating loads with a large number of load alternations. This type of load is a main cause of damages to the aforementioned components and structures. In welded connections, the material fatigue behavior is locally concentrated, in particular, to the welding seam because the fatigue strength of the steel is significantly reduced due to the structural transformation and high stress concentration during the welding process. Due to the stress concentration of the welding, known welded reinforcing steel rod mats or round bars do not reach the fatigue strength prescribed in DIN 1045-1 for applications that are not predominantly subjected to static loads, but rather only a fatigue strength that clearly lies below the Woehler curve for rods. Among experts, there has long been a biased opinion with respect to the suitability of welded connections or, more accurately, the suitability of welded reinforcing steel rod mats for the DIN-conforming use in components that are not predominantly subjected to static loads. Such welded mats are only rendered usable due to costly additional material or the use of steels of the highest quality in the first place. Consequently, individual rods that had to be manually connected to one another by means of thin wires in a laborious and time-consuming fashion at the construction site have predominantly been used until now such that this type of producing a surface that can be subjected to dynamic loads is correspondingly expensive due to the costly manual connection. If welded reinforcing steel rod mats were used instead, the steel consumption increased considerably because a sufficiently large amount of material had to be added.

The preceding statements also apply to uniaxial reinforcing steel rod mats that not only feature the reinforcing steel rods that statically act in only one direction, but also flexible stay braces that connect the individual reinforcing steel rods to one another and make it possible to roll up the finished uniaxial reinforcing steel rod mat. Since uniaxial reinforcing steel rod mats can only absorb tensile forces in one direction, namely their transverse direction, two uniaxial reinforcing steel rod mats that are turned relative to one another by 90° therefore are required for enabling a reinforced concrete component to absorb tensile forces and bending moments in every direction. Uniaxial reinforcing steel rod mats have widths up to 15 m and may contain reinforcing steel rods of different diameters and lengths. They are delivered to a construction site in rolled-up form and easily and quickly unrolled with little manpower and effort such that the use of uniaxial reinforcing steel rod mats basically is highly advantageous, namely also in the production of reinforcing steel components that are not predominantly subjected to static loads.

One object of the present invention is therefore to disclose a welding method, in which the currently required addition of material during the production of reinforcing steel rod mats is eliminated and the manual interlacing of the individual steel rods at the construction site is no longer necessary. Another object of the invention is to disclose a machine for producing welded reinforcing steel rod mats, the mats of which can withstand loads that are not predominantly static without the addition of material. Still another object of the invention is to disclose such a welded reinforcing steel rod mat.

The objective with respect to the method is achieved with a method that comprises the steps of: a) positioning at least one welding device and at least two identical or different elements of the group formed by: ribbed reinforcing steel rods, stay braces, steel rods or steel elements with areas of increased diameter in comparison with their respective core diameter relative to one another, and b) welding the elements in the area of at least one of their ribs or in the area of their increased diameter in comparison with their core diameter, and c) repeating steps a) to b) until the desired number of welded connections has been produced. The invention minimizes the structural transformation in the welded steel in an extremely advantageous fashion, namely in that it advantageously utilizes an area of the steel element that is already provided with additional material. In the case of reinforcing steel rod mats, these are the ribs thereof, regardless of whether they consist of longitudinal or transverse ribs; in the case of steel rods, these are the areas with an increased diameter such as, for example, integral webs or plate sections; in the case of other steel elements, these are the corresponding areas thereof. These areas may be produced subsequently in the form of webs, curved parts, ribs or the like or already be present on reinforcements of steel elements that have a more elaborate constructive design. These steel elements with a more elaborate constructive design include all three-dimensional concrete reinforcing structures that resemble, for example, an I-beam or a T-beam or a double-T beam. According to the invention, it is therefore not of primary importance to use round bar steel or reinforcing steel rods, but rather to produce the respective welding point in an area that has a greater material thickness such that the structure of the respective core material is transformed as little as possible. In the case of reinforcing steel rods and therefore in the case of uniaxial and biaxial welded mats made of reinforcing steel rods, the ribs thereof may be considered for this purpose. In the case of uniaxial mats, the welding takes place between a rib and a stay brace that does not necessarily have to feature an area with greater material thickness. However, this is negligible because the stay brace does not have any function within the statics of the subsequent concrete component and may break after installation. Consequently, uniaxial as well as biaxial reinforcing steel rod mats can be produced in addition to other reinforcement connections by means of the method according to the invention. In the invention, it is not important in which order the welding device and the product to be welded are positioned relative to one another, i.e., whether a movable welding device is displaced across previously positioned elements, the elements are individually or collectively displaced into a stationary welding device or a mixed form thereof is used, as long as the welded connection is produced in the area of greater material thickness. According to the invention, the method is repeated until the desired number of welded connections has been produced. This can mean that all of the connections or only some of these connections are welded, wherein the latter may be desirable, in particular, in the case of mats. Due to this surprising solution, a reinforcing steel rod mat produced in this fashion advantageously lies above the Woehler curve for rods according to DIN 1045-1, namely even at 175 N/mm$^2$ and $10^6$ load cycles. Although the inventive welding area excludes large surfaces of the reinforcing steel rod from the welding process and therefore makes an exact and precisely controlled positioning of the reinforcing steel rod desirable, the advantages by far exceed the disadvantages, particularly with respect to material costs. In this way, the long-existing biased opinion among experts with respect to the suitability of welded reinforcing steel rod mats for components that are not predominantly subjected to static loads is resolved. Reinforcing steel rod mats produced in this fashion already act like rods according to DIN-1045-1 without any additional material and therefore can be used surprisingly well.

According to the invention, the welded connection may consist of a tack weld.

In an embodiment of the method, it is proposed that a position control and, if applicable, a correction of the position of the element(s) to be welded is carried out in or after step a), wherein the position control utilizes mechanical or optical sensors, in particular measuring sensors, and/or the correction of the position is realized by rotating the element or displacing it in the longitudinal direction thereof. Such a position control may be required to ensure welding at the correct location. Depending on the design of the welding electrodes and the product to be welded, such a step can be omitted, for example, if welding always must take place on a rib or the like due to geometric circumstances or spatial distribution. Although an optical measurement such as, for example, a light barrier can indeed be used under the rough ambient conditions caused by metal dust and metal abrasion, dirt, moving masses and the like, it is preferred, according to the invention, to use mechanical measuring methods, particularly measuring sensors or probes that utilize the non-circular cross section of the elements. It is decisive that these known methods operate with sufficient reliability and for a sufficiently long period of time under the rough conditions of mat production. A correction of the position is primarily required with respect to the position of the ribs relative to the welding device and/or the other ribs and may, according to the invention, be realized by means of a rotation of the rod and/or slight changes in position along its longitudinal axis.

The applicant has determined that, in the case of reinforcing steel rods, it is particularly advantageous to carry out step b) in the area of more than 30% of the maximum height of the respective rib, preferably more than 60%, most preferably in the area of more than 80%. Even at such small rib heights, the protection of the rod core material by means of the rib material suffices for minimizing the structural transformation at this location to such a degree that sufficient fatigue strength is provided and material fractures do not occur in the area of the welding seam, if possible, but rather in the area of the free rod length. In this way, the surface of the reinforcing steel rod that can be used for welding advantageously is once again slightly increased.

In an embodiment of the method according to the invention, it is proposed to carry out a step d) of the position control of the welding seams, wherein this step represents a quality assurance measure. It is therefore ensured that only mats are produced that meet the respective requirements and, in particular feature a sufficient number of correct welding seams.

It also contributes to the quality of the method according to the invention that step b) is carried out under welding control, particularly by controlling the energy input. In this way, it not only becomes possible to also use the edge areas of the lunulate ribs that are located farther outside for welding, but also to purposefully weld reinforcing steel rods of different diameters to one another in a simpler fashion. This last type of connection, however, can also be produced without welding control.

The inventive method and the inventive machine are advantageously realized such that the welding parameter control controls the welding device in such a way that pre-selected welding points are omitted in order form undisturbed areas of the reinforcing steel rod mat. This increases the quality of the reinforcing steel rod mat because it features undisturbed areas, in particular, where statically required.

The objective with respect to the device is achieved with a machine that serves for producing welded reinforcing steel rod mats for use in the production of DIN-conforming reinforced concrete components that are not predominantly subjected to static loads and features at least one welding device and at least one steel rod feed, wherein the welding device is realized such that it interconnects two or more identical or different elements of the group: ribbed reinforcing steel rods (2), stay braces (4) and steel rods with areas of increased diameter in comparison with their respective core diameter.

Advantageous embodiments of the machine can be gathered from the dependent claims.

In other respects, the inventive machine may be realized as described in EP 0 862 958 and/or in PCT/DE2009/000298. The disclosure of these documents therefore is expressly incorporated into the content disclosed in this application and forms part of the object of this application with respect to the design of a machine for producing corresponding uniaxial reinforcing steel rod mats.

A preferred embodiment of the invention is described below in an exemplary fashion with reference to the drawings, wherein further advantageous details can be gathered from the figures of the drawings.

In this case, components with identical function are identified by the same reference numerals.

Figure 2:
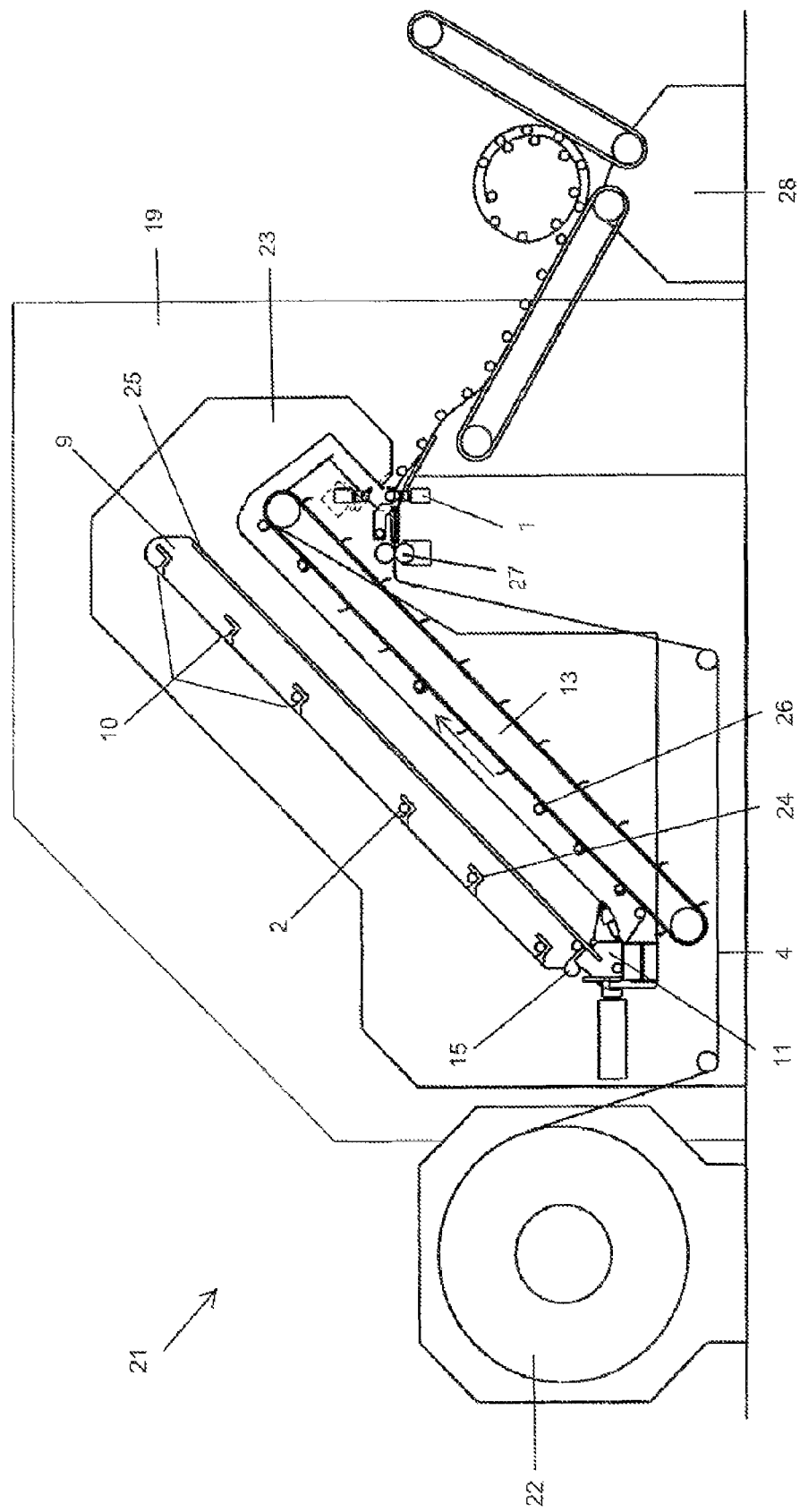
Figure 3:
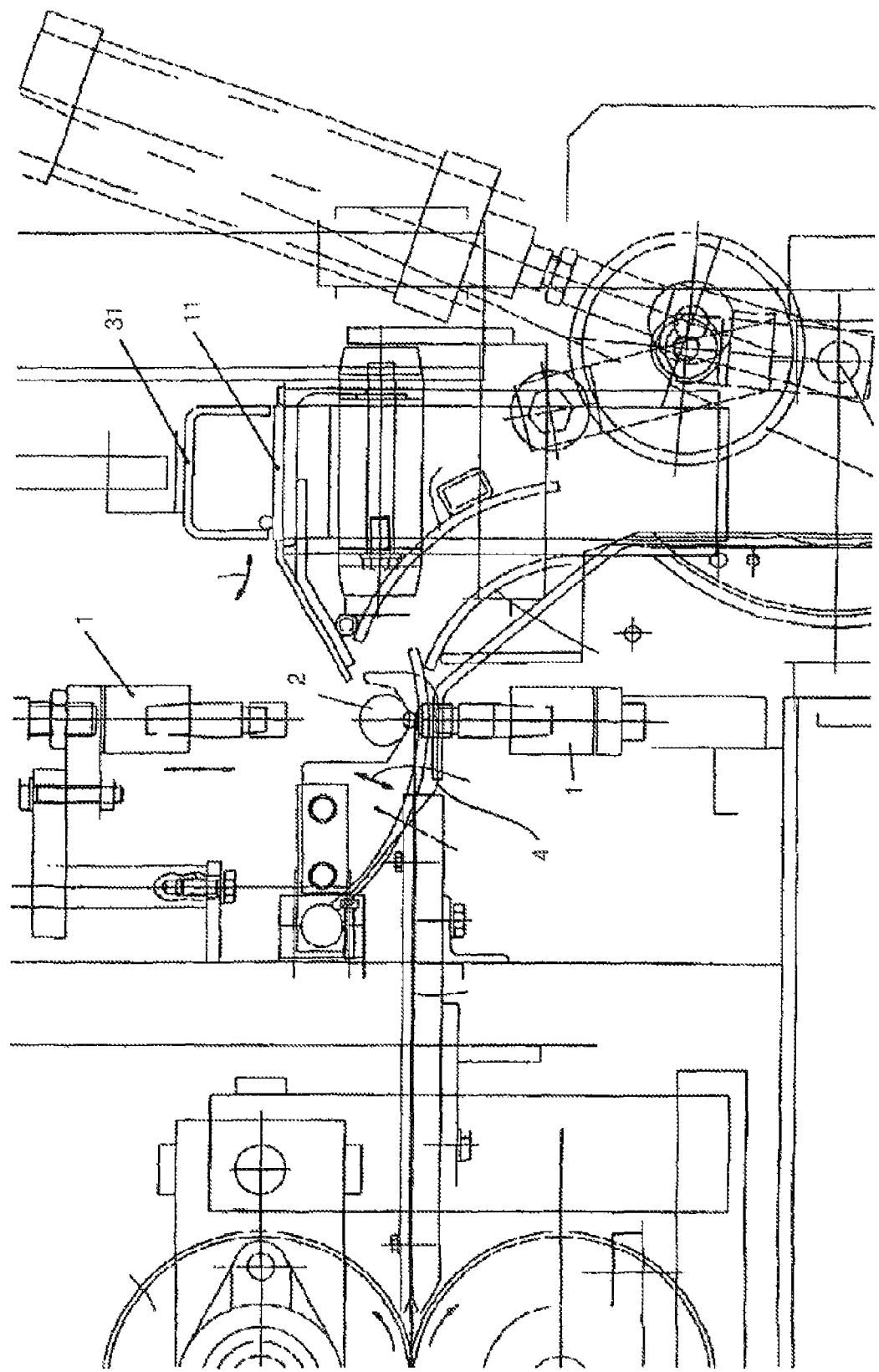
Figure 4:
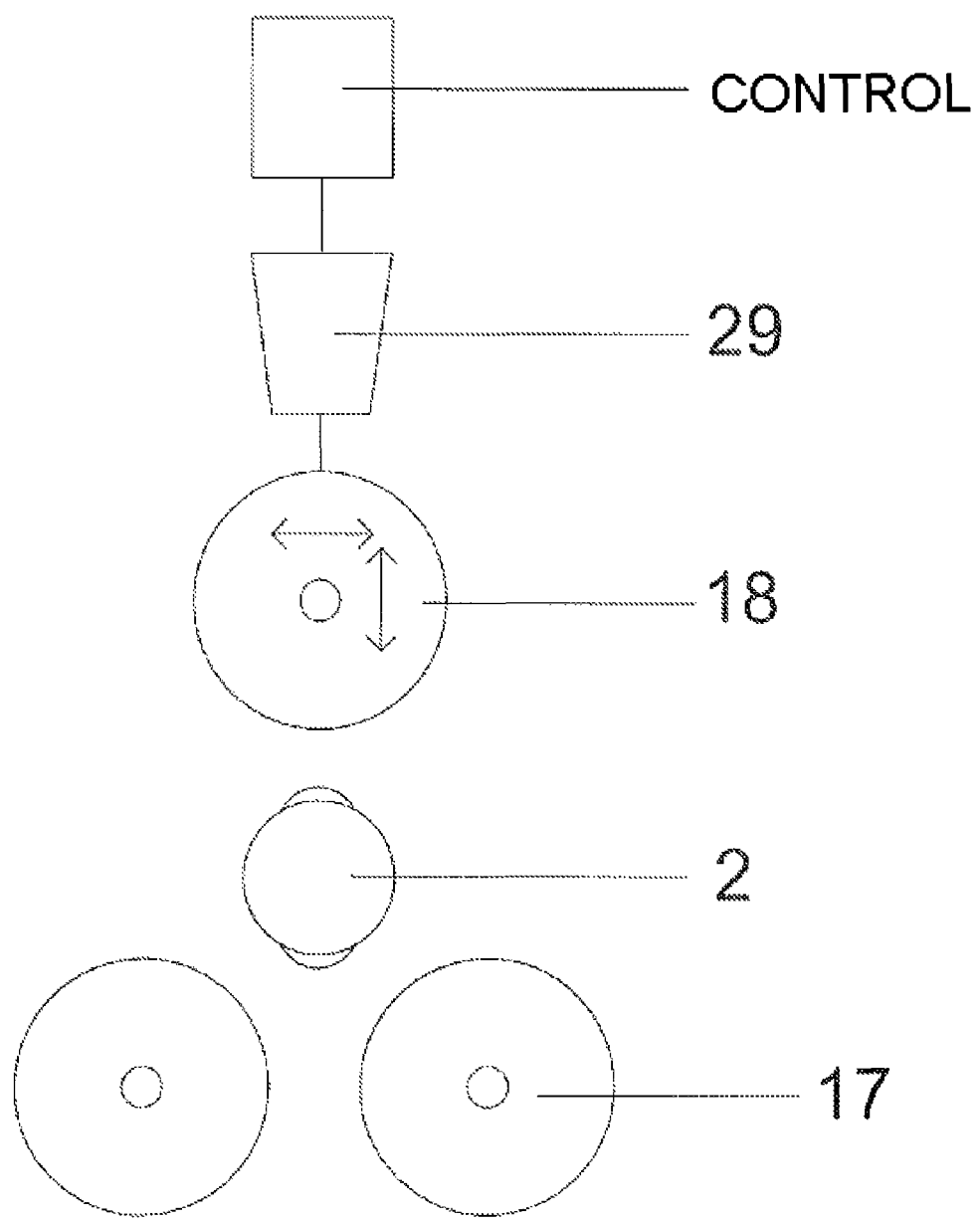

In the individual figures of the drawings:

FIG. 1 shows a top view of an embodiment of the machine for producing a uniaxial reinforcing steel rod mat, FIG. 2 shows a side view of an embodiment, FIG. 3 shows a side view of another embodiment of the machine, FIG. 4 shows a drawing of a position control and correction unit according to the invention, and FIGS. 5a, b respectively show a drawing of a reinforcing steel rod.

FIG. 1 shows a top view of an inventive machine for producing uniaxial reinforcing steel rod mats. This machine has a total length of approximately 30 meters, 15 meters of which are allotted to the mat former 6. Storage magazines 5 for reinforcing steel rods 2 are illustrated to the left and to the right of the mat former 6, wherein said storage magazines are in this case realized in the form of rod formers 19 that unwind, straighten and cut to size wires of different diameters that are wound onto coils 20. According to the invention, the coils 20 carry wire with a diameter up to 20 mm. Due to the mechanical deformation of the wires during the rod formation, their suitability for the method according to the invention may diminish. In this case, a storage magazine 5 in the form of a rod magazine, in which prefabricated reinforcing steel rods 2 are stored and from which the prefabricated reinforcing steel rods are manually or mechanically transferred into the infeed area, particularly to the reinforcing steel rod inlet 7, would be located to the right and/or to the left of the mat former 6. In this exemplary embodiment, the coils 20 to the right and to the left of the mat former 6 carry reinforcing steel wire of identical or different diameter. This figure clearly shows that a rod former 19, which is also referred to as a straightening-cutting machine, always feeds the wire of a coil 20 into the mat former 6 at the same location such that a coil 20 always supplies one and the same storage position 10 of a first intermediate reinforcing steel rod storage 9 via the same reinforcing steel rod inlet 7. According to the invention, it would also be possible to realize embodiments, in which only one straightening-cutting machine 19 is provided, or embodiments, in which two straightening-cutting machines 19 are provided that are designed for either supplying their own or common storage positions 10. In the latter instance, the same storage position 10 can be supplied with different reinforcing steel rod diameters while the number of storage positions 10 doubles in the first instance such that the production speed is increased. According to the invention, each rod former 19 in the form of a straightening-cutting apparatus is provided with two motors such that two reinforcing steel rods 2 per rod former 19 can be fed simultaneously into the mat former 6. The mat former 6 is composed of individual segments 21, wherein the segments 21 are connected to one another by means of components as described further below. FIG. 1 also shows that a stay brace 4 is assigned to each segment 21, namely on a stay brace storage drum 22 in the example shown. These drums are arranged individually and easily accessible such that an exchange can be realized without extended machine standstill. The exemplary embodiment shown therefore refers exclusively to a machine for producing uniaxial reinforcing steel rod mats.

FIG. 2 shows a section along the line A-A in FIG. 1, particularly a cross section of a segment 21. The outline of a rod former 19 realized in the form of a straightening-cutting machine is also shown. According to the invention, a segment 21 is formed by a supporting arm 23 that carries the other assemblies. Although this is not illustrated in the figures, the segment 21 is preferably driven by a common drive for all segments 21 via a shaft or the like. A pedestal in the bottom area of the segment 21, to which it is fastened and which connects all segments 21 to one another, is also not illustrated. A prefabricated reinforcing steel rod 2 or a reinforcing steel rod fabricated by means of the rod former 19 is manually fed into each of the six storage positions 10 shown, wherein a storage position 10 is formed by the pivotable reinforcing steel rod holders 24 of all segments 21 that lie on a common, straight connecting line. The reinforcing steel rods 2 required for forming the uniaxial reinforcing steel rod mat therefore are placed into six storage positions 10 that are horizontally and vertically spaced apart from one another and stored therein for processing. The first intermediate reinforcing steel rod storage 9 accordingly is formed by these six storage positions 10. According to the invention, this first intermediate storage 9 is supplied by the mat former on both sides in this embodiment, wherein each of the two rod formers 19 is in this embodiment supplied by coils 20 such that it does not transport reinforcing steel rods 2 of same diameter into the same storage position 10. This has the advantage that consecutive reinforcing steel rods 2 of the same diameter can be processed more quickly in the reinforcing steel rod mat. The drawings do not show embodiments of the invention, in which each of the two rod formers 19 supplies its assigned storage positions 10 or in which only one rod former 19 is available or in which only one storage magazine 5 is available or in which prefabricated reinforcing steel rods are fed in. In the first two instances, there would respectively exist 12 or 6 storage positions 10. A stored reinforcing steel rod 2 is released by pivoting the reinforcing steel rod holder 24 that holds it such that the reinforcing steel rod strikes an impact sheet metal 25 extending through the entire mat former 6 and slides down on said impact sheet metal until it reaches a stop 15. After being released by the displaceable stop 15, the reinforcing steel rod 2 drops onto a transverse positioning device 11, from which it is transferred to a chain conveyor 26 with drag elements. The chain conveyor 26 feeds the transversely positioned reinforcing steel rod 2 to a welding machine 1 that connects it to the stay brace 4. According to the invention, the stay brace 4 extends in the bottom area of the supporting arm 23 and is removed from the stay brace storage drum 22 and supplied to the welding device 1 by means of a friction roller drive 27. After connecting the reinforcing steel rod 2 and the stay brace 4, the uniaxial reinforcing steel rod mat being formed is transferred into a delivery area 28, where it is wound up into a roll. The first intermediate reinforcing steel rod storage 9 is advantageously supplemented with a second intermediate reinforcing steel rod storage 13 in the form of the chain conveyor 26 that already intermediately stores the transversely positioned reinforcing steel rods 2 prior to processing and simultaneously transports them into the fastening area. The machine can be easily accessed due to the segment-like design.

FIG. 3 shows a side view of another embodiment of the machine, in which the reinforcing steel rods are not intermediately stored and the transverse positioning device 11 is formed by a displaceable belt overarched by a u-shaped position protection 31 that simultaneously serves as ejector. In this embodiment, the transversely positioned reinforcing steel rod 2 is also fed to a welding device 1 and connected to a stay brace at its ribs.

FIG. 4 finally shows a drawing of a position control and correction unit 8 according to the invention. A reinforcing steel rod 2 is fed in between two rolls 17. A drive unit 18 can be displaced onto the reinforcing steel rod 2 vertically from the top and horizontally and functionally engages therewith such that it rotates. In this case, the drive unit features a hydraulic cylinder 29, the stroke length of which can be tracked. The area with the largest diameter caused by the rib-related "egg-shaped" cross section can be determined by rotating the reinforcing steel rod 2 about its longitudinal axis by at least 360°. For this purpose, a control is provided that also controls the drive unit such that the reinforcing steel rod 2 comes to rest in the correct position for the welding electrode arranged offset relative to the position control unit 8. Such a mechanical probe is particularly reliable under the rough ambient conditions of mat production because it is not susceptible to soiling and at the same time provides sufficient accuracy. It goes without saying that other sensors such as, for example, light barriers, lasers, video monitoring or automatic image recognition can also be used. The unit of the inventive machine, by means of which the reinforcing steel rod 2 can be repositioned along its longitudinal axis, is not illustrated.

For clarification purposes, FIGS. 5*a, b* respectively show a drawing of a reinforcing steel rod in the form of longitudinal top view and a cross section. These figures clearly show the lunulate ribs 3 that are spaced apart from one another and arranged obliquely to the transverse axis. FIG. 5*b* respectively shows a longitudinal rib 30 between the facing ends of the ribs 3 of a rod side. A welding area S of the rib 3, in which sufficient rib material for safely carrying out the method is available in any case, is marked in the figure.

It is important that the invention securely positions the reinforcing steel rods 2 and the welding device 1 relative to one another such that welding can be carried out in the area of the ribs 3, preferably in the area of the greatest rib height H.

LIST OF REFERENCE NUMERALS

1 Welding device
2 Reinforcing steel rod
3 Rib
4 Stay brace
5 Reinforcing steel rod storage magazine
6 Mat former
7 Reinforcing steel rod inlet
8 Position control and correction device
9 First intermediate reinforcing steel rod storage
10 Storage position
11 Transverse positioning device
12 Reinforcing steel rod holder
13 Second intermediate reinforcing steel rod storage
14 Transport path
15 Displaceable stop
16 Displaceable stop
17 Roll
18 Drive unit
19 Rod former
20 Coil
21 Segment
22 Stay brace storage drum
23 Supporting arm
24 Reinforcing steel rod holder
25 Impact sheet metal
26 Chain conveyor
27 Friction roller drive
28 Delivery area
29 Hydraulic cylinder for position determination
30 Longitudinal rib
31 Position protection

The invention claimed is:

1. A method for producing welded connections between steel bodies being subject to alternating loads under operational conditions, the method comprising the steps of:
   a) positioning at least one welding device and at least two different elements of the group formed by: obliquely ribbed reinforcing steel rods and stay braces, relative to one another;
   b) welding the obliquely ribbed reinforcing steel rod exclusively in the area of at least one of its oblique ribs to another element; and
   c) repeating steps a) to b) until the desired number of welded connections has been produced,
      wherein providing a position control and a correction of the position of the obliquely ribbed reinforcing steel rod to be welded is carried out in or after step a), wherein the position control utilizes mechanical or optical sensors, wherein the position correction comprises rotating the element(s) about its longitudinal axis by at least 360°, and wherein step b) is carried out in the range of more than 30% of the maximum height of the respective rib.

2. The method according to claim 1, wherein a position control and a correction of the position of the element(s) to be welded is carried out in or after step a), wherein the position control utilizes mechanical or optical sensors.

3. The method according to claim 1, wherein a step d) of controlling the welding seams is carried out.

4. The method according to claim 1, wherein step b) is carried out under a controller.

5. The method according to claim 1, wherein the welding parameter control controls the welding device (1) in such a way that pre-selected welding points are omitted in order to form undisturbed areas of the reinforcing steel rod mat.

* * * * *